July 21, 1970

W. C. FARLEY 3,521,173

PHASE DETECTOR

Filed June 21, 1967

INVENTOR
WALTER C. FARLEY

BY Arnold, Raylance, Kruger & Durkee
ATTORNEYS

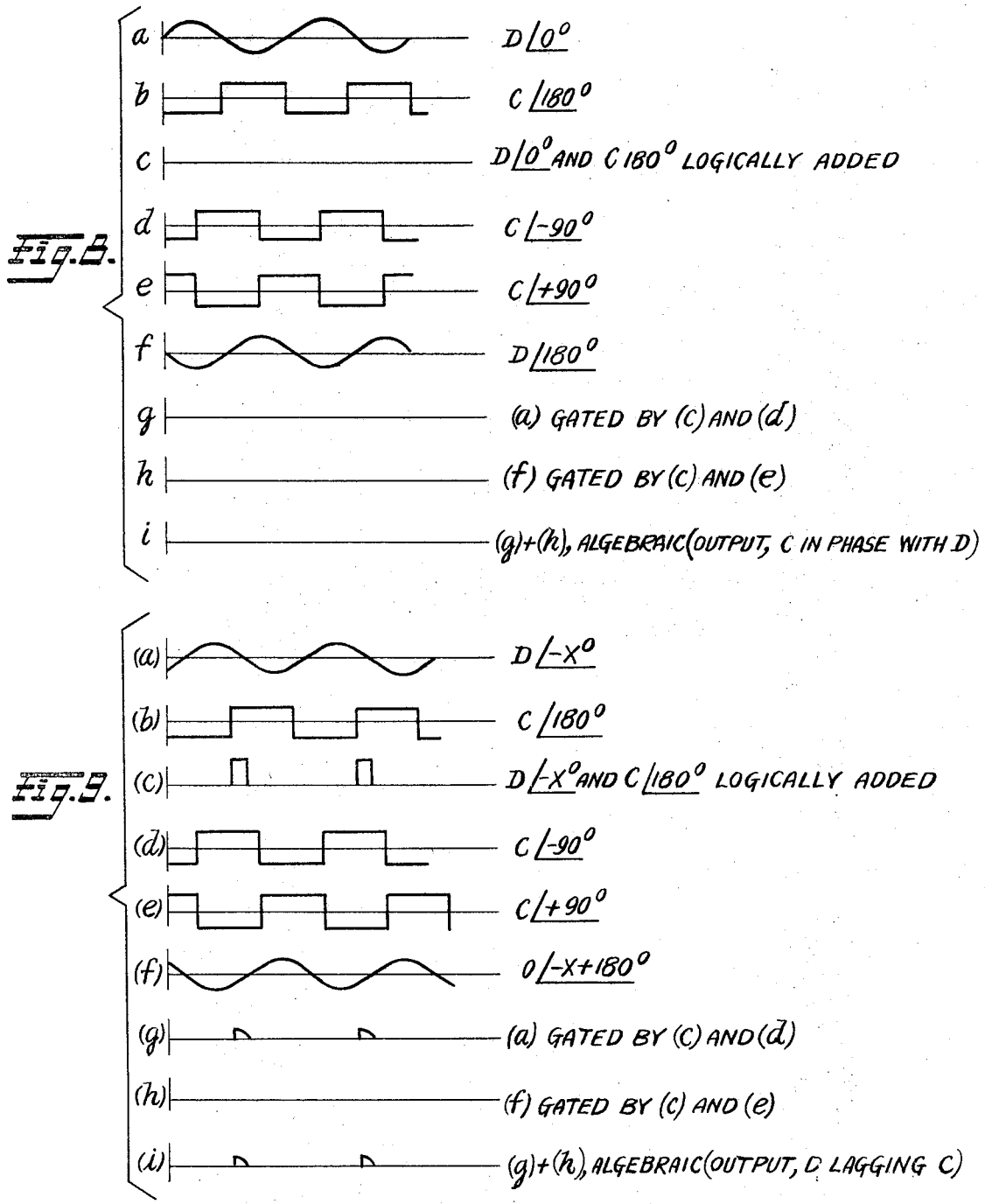

3,521,173
PHASE DETECTOR
Walter C. Farley, Silver Spring, Md., assignor to Weston Instruments, Inc., Newark, N.J., a corporation of Delaware
Filed June 21, 1967, Ser. No. 647,684
Int. Cl. H03k 9/06
U.S. Cl. 328—134                                   3 Claims

ABSTRACT OF THE DISCLOSURE

An input signal and an inverted reference signal are logically added to produce a gate signal. The gate signal is used to switch two gate circuits together with two reference signals separated by 180° from each other and 90° from the inverted reference. The result is summed to produce a phase error signal which is unidirectional when there is a phase difference and zero when there is none.

---

This invention relates to phase comparator apparatus and, more specifically, to circuit apparatus for comparing two electrical signals and developing an error signal representative of their phase relationships.

Phase comparators and detectors are broadly old in the electrical and electronic arts, many having been developed using widely varying techniques to suit the many needs of the industry. One type of detector in the prior art uses the technique of logically switching an input electrical signal with a reference signal to obtain an AC waveform, the polarity of the average value of which is representative of the direction of phase difference between the input signal and the reference. The filtered output of this type of detector is primarily DC, the magnitude of the DC signal being representative of the magnitude of the phase difference.

Although the output of the above described prior art phase detector is mostly DC, an AC component is nearly always present. The AC ripple can be eliminated, but to do so requires extensive filtering. Even when the input signal is exactly in phase with the reference signal, the ripple is present, the amplitude of the ripple being substantially constant (for any one preselected filtering system) regardless of the magnitude of the DC component. The existence of this ripple or of the inherent time delay of a filter can cause instability, or "hunting," when the phase detector is used as a part of a closed loop system. As will be recognized by those skilled in the art, increased filtering means increased weight, size and cost in a practical piece of equipment.

An object of the present invention is to provide an improved phase detector apparatus.

Another object is to provide apparatus for comparing the phase angles of two electrical signals and for providing an error signal which goes to zero when the two signals are in phase.

A further object is to provide apparatus for determining the phase relationship between two signals and for producing a unidirectional error signal of one polarity when a phase difference exists in one direction, a unidirectional error signal of the other polarity when the other difference is in the opposite direction and a zero signal when there is no phase difference.

In a practical embodiment of the invention, the foregoing objects are attained by providing the reference signal at three phase angles separated by 90 electrical degrees and by using these signals to switch and gate the input (unknown) signal. The input signal is provided in two phase relationships separated by 180°, i.e., normal and inverted. Each of the two forms of the input signal is switched by one of two of the phases of the reference signal. The remaining phase of the reference signal is logically combined with one of the phases of the input signal, the resulting signal being used to gate the previously switched signals. The switched signals are then algebraically added. In a further embodiment, two phases of the input signal are gated by the simultaneous existence of one phase of the reference signal and the logical sum of a reference signal phase and an input signal phase.

In order that the manner in which the foregoing and other objects are attained in accordance with the invention can be understood in detail, particularly advantageous embodiments thereof will be described with reference to the accompanying drawings, which form a part of the specification and wherein:

FIGS. 8 and 9 are waveform diagrams showing the relationships of waveforms in the embodiment of FIG. 3.

Figure 1:
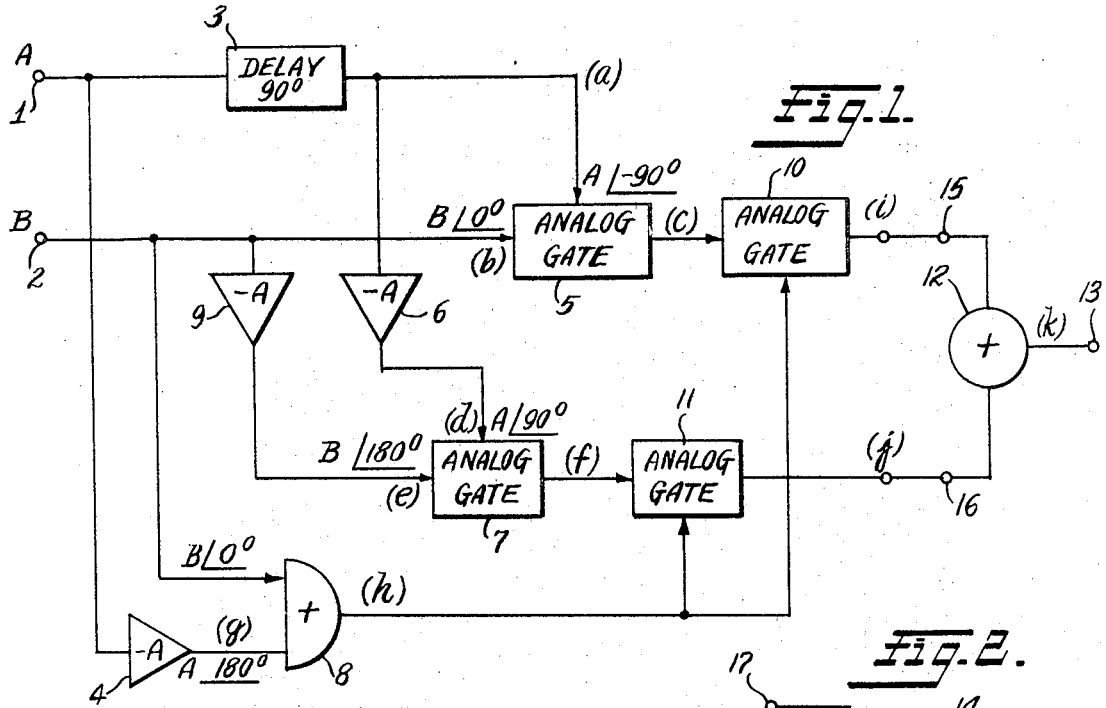
FIG. 1 is a schematic diagram of one embodiment of the invention.
Figure 6:
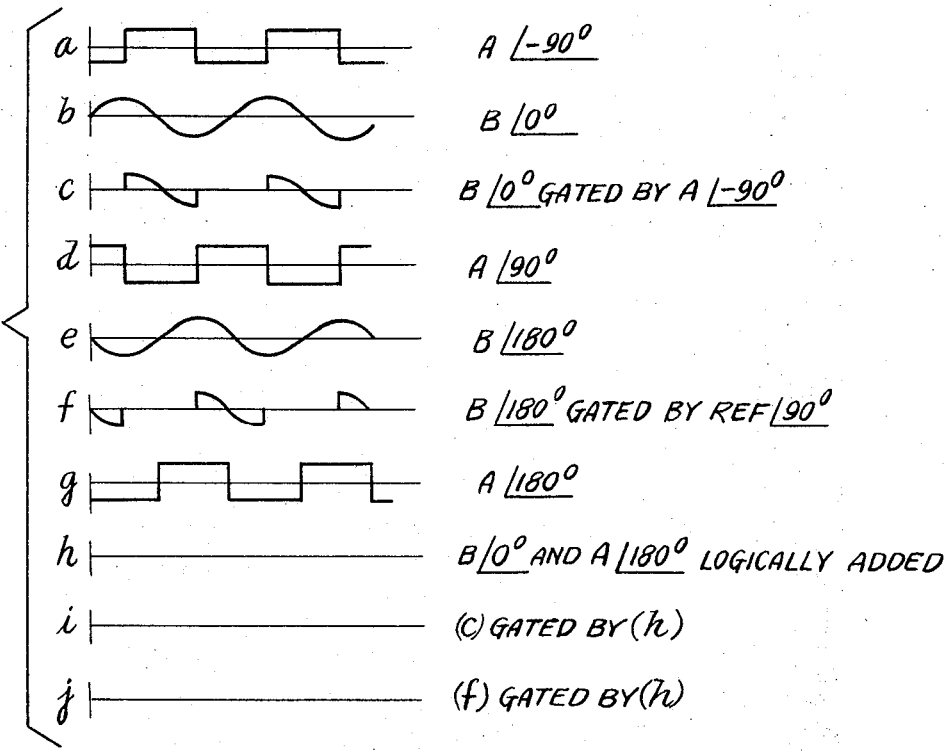
FIGS. 6 and 7 are waveform diagrams showing the relationships of waveforms in the embodiment of FIG. 1.

In FIG. 1, input signals A and B are applied to input terminals 1 and 2, respectively, signal A being the reference signal to which the phase relationship of input signal B is to be compared. Signal A is applied to the input terminal of a 90° delay circuit 3 and to the input terminal of a conventional inverting amplifier 4. The output of delay circuit 3, which is shown in FIG. 6(a) is applied to the control input terminal of an analog gate circuit 5 and to the input terminal of a conventional inverting amplifier 6. The output of amplifier 6, which is shown at FIG. 6(d), is applied to the control input terminal of an analog gate circuit 7. The output of inverting amplifier 4 is applied to one input terminal of an AND circuit 8, this input signal being shown at FIG. 6(g). The delay circuit and inverting amplifiers thus far mentioned operate to provide three reference signals separated by multiples of 90° from each other and from the zero reference signal applied to input terminal 1. It will be noted that in FIG. 6 reference signal A is shown as a rectangular wave. This wave shape is advantageous in the reference signal because of the superior switching conditions which are obtained with a rectangular waveform, but is not essential.

Input signal B, applied to input terminal 2, is connected to the other input terminal of AND circuit 8, as shown at FIG. 6(b), and to the signal input terminal of analog gate circuit 5. Input signal B is also applied to the input terminal of a conventional inverting amplifier 9, the output of which is connected to the signal input terminal of analog gate circuit 7, as shown in FIG. 6(e). It is seen that the input signal need be supplied only in the normal and inverted forms.

Analog gate circuits 5 and 7 can be any conventional circuit in which a conductive path is switchable to either of two states, conductive or nonconductive. The state of the path is controlled by the application of a signal to an input control terminal. The signal applied to the signal input terminal, when the path is in a conductive state, is provided at the output terminal in a substantially unmodified form. Thus, the analog gates can be viewed as electromagnetic relays having an energizing winding and a normally open set of contacts which are closed when an energizing signal is applied to the winding. When the contacts are closed, the input signal is passed without modification.

AND circiut 8 is a conventional logic circuit which is capable of accepting two input signals and providing an output signal only when both input signals exist with a predetermined polarity. The output signal, seen at FIG. 6(h), thus bears a particular time relationship to the two input signals, but need not follow either input signal as to amplitude or waveform. The output of AND circuit 8 is applied to the control input terminals of analog gate circuits 10 and 11. The output of analog gate circuit 5 is connected to the signal input terminal of analog gate circuit 10, and the output of analog gate circuit 7 is connected to the signal input terminal of analog gate circuit 11. The outputs of analog gate circuits 10 and 11 are connected to the two inputs of a summing device 12 which algebraically combines these two signals and provides the sum at an output terminal 13.

Figure 7:
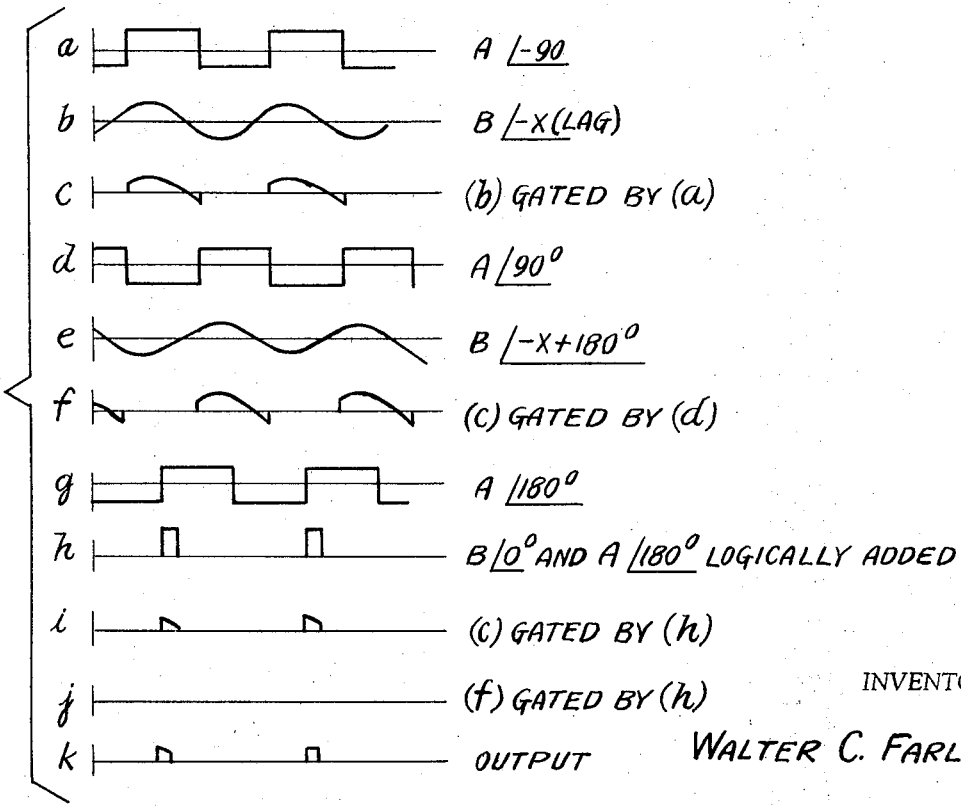

The operation of the apparatus of FIG. 1 can be understood by referring to FIGS. 6 and 7, FIG. 6 showing a circumstance in which signals A and B are exactly in phase. Signal A, delayed by 90° and 270°, is applied as the switching control signal to gates 5 and 7. The conductive paths of gates 5 and 7 are closed only when the signals shown in FIGS. 6(a) and 6(d), respectively, are positive. The input signal to gate 5, FIG. 6(b) is therefore switched by the signal at FIG. 6(a) to produce a partial waveform shown at FIG. 6(c). The inverted input signal, FIG. 6(e), is switched to produce the partial waveform shown at FIG. 6(f). These two signals are applied to the input terminals of gates 10 and 11 to be switched by the output of AND circuit 8.

When the waveforms shown in FIGS. 6(b) and 6(g) are logically added, it will be obvious that the result is a zero signal at the output terminal of AND circuit 8. Thus, no switching signal is applied to either control terminal of gate circuits 10 or 11, and no output is applied to summing circuit 12. The output at output terminal 13 is therefore zero, not only zero DC, but also zero AC.

Now consider FIG. 7, which signal B is assumed to be lagging signal A by some unknown angle X. The individual waveforms are identified as in FIG. 6 so that waveform (b) is switched by waveform (a) to produce partial waveform (c). Meanwhile, waveform (e) is switched by waveform (d) to produce the partial waveform at (f).

Because of the fact that the signals applied to the input terminals of AND circuit 8 are not precisely 180° out of phase, the logical addition of these signals results in the spaced rectangular pulses shown as waveform (h). These pulses are applied simultaneously to gate circuits 10 and 11 to switch the partial waveforms shown at (c) and (f) to produce the pulses at (i). The width of the pulses in FIG. 7(i) is proportional to the magnitude of the phase difference between the two input signals, the magnitude becoming increasingly large as the phase difference increases. There is, of course, no output from analog gate 11 because the pulses at (h) do not coincide with the partial waveforms produced by gate 7. The summing circuit 12 accepts the signal at waveform (i) and provides it to output terminal 13 as a phase error signal.

As can be seen by visualizing waveform 7(b) moved to the left rather than to the right with respect to the waveform shown in FIG. 7(a), a greater portion of the negative part of waveform (b) will be passed by the appropriate analog gate when a phase leading condition exists. Further, the pulses produced by AND circuit 8 will select segments of this negative waveform as the output signal. Thus, the pulses appearing at waveform (i) would be negative going rather than positive going pulses and the resulting output signal is negative. A negative output signal can therefore be seen to indicate a leading phase condition, whereas a positive output signal indicates a lagging phase relationship. Obviously, the resulting output signal at terminal 13 is unidirectional but is pulsating.

Filtering would therefore be necessary in some circumstances.

Figure 2:
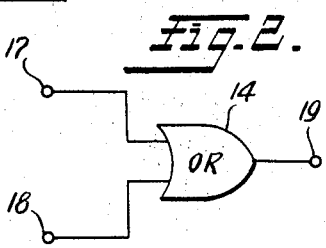
FIG. 2 is a schematic diagram of a circuit portion substitutable in the embodiment of FIG. 1.

Because of the existence of output signals from gate circuits 10 and 11 in the form of variable width pulses, summing circuit 12 can be replaced by a logic circuit such as an OR circuit 14 shown in FIG. 2. By disconnecting summing circuit 12 at terminals 15 and 16 and connecting the OR circuit to those points with terminals 17 and 18, the substitution can be accomplished. In the embodiment using this logical circuit, the output pulses provided at output terminal 19 can be of uniform, large amplitude, substantially indepedent of the instantaneous magnitude of the error signals at the output terminals of gates 10 and 11. The phase error signal produced from these pulses is therefore strictly on the pulse width variation which is proportional to the phase angle difference, and is not related to the amplitude of input signal B at that point. A similar result can be attained by pulse amplification and hard limiting, as will be recognized by those skilled in the art.

Figure 5:
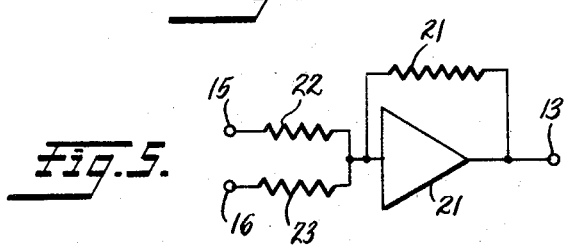
FIG. 5 is a schematic diagram of a summing circuit usable in the embodiments of FIGS. 1 and 3.

However, if an algebraic summing circuit is desired, one such as that shown in FIG. 5 can be used, this circuit including a conventional high gain DC amplifier 20 having a feedback resistor 21 connected between the input and output terminals of the amplifier to form an operational amplifier. The input terminal of the amplifier is connected to one terminal of two resistors 22 and 23, the other terminals of these resistors being connected to terminals 15 and 16, as shown in FIG. 1. The output terminal of the amplifier is connected to output terminal 13. The circuit of FIG. 5 is well known in the art and need not be further described.

Figure 3:
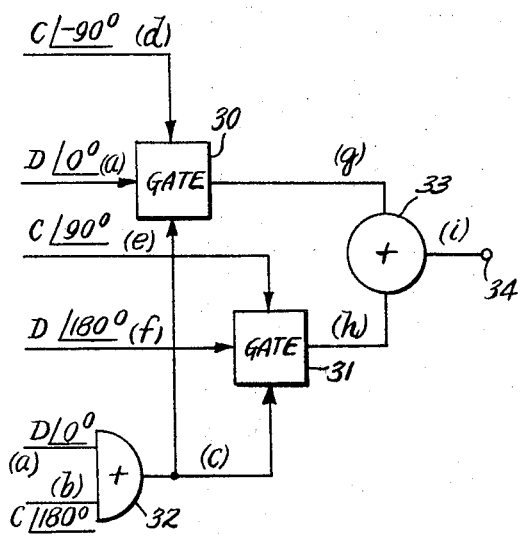
FIG. 3 is a schematic diagram of a further embodiment of the invention.

A further embodiment of the invention is shown in FIG. 3, in which, to avoid confusion, the input signals have been designated as signals C and D. For simplicity, the delay circuits and inverting amplifier shown in FIG. 1 have not been shown in FIG. 3, but it will be understood that similar devices can be used to separate a reference signal C into components separated by 90° as before, and to provide the input signal D in its normal and inverted forms. The normal form of input signal D is applied to the switchable conductive path of a gate circuit 30 and the inverted form of signal D is applied to the signal input terminal of a gate circuit 31. The reference signal C in inverted form and the normal form of input signal D are applied to the two input terminals of a conventional AND circuit 32. The output of AND circuit 32 is connected to one control input terminal of each of gates 30 and 31.

Gate circuits 30 and 31 are of a type which has a switchable conductive path, as described with reference to the gate circuits in FIG. 1, but has two control terminals rather than one. Circuits 30 and 31 also have the operational requirement that signals of the proper polarity be simultaneously provided at both input terminals in order to render the switchable path conductive. The reference signal C, having been divided and delayed by 90° and 270°, are connected to the second control input terminals of gates 30 and 31. The outputs of gates 30 and 31 are connected to the inputs of a summing circuit 33 which is similar to summing circuit 12 of FIG. 1. Circuit 33 algebraically combines the outputs of the gate circuits and provides a composite phase error signal to output terminal 34.

The input signal, in the condition when it is in phase with the reference signal, and the manner in which the embodiment of FIG. 3 determines this relationship can be seen by referring to FIG. 8 wherein the waveforms are identified by small letters as before. The input signal at waveform 8(a) is gated by the simultaneous existence of waveforms (c) and (d), (d) being the reference signal delayed by 90°. Waveform (c), when the reference signal inverted and the uninverted input signal are exactly 180° apart, produces no logical output from AND circuit 32, The output from gate circuits 30 and 31 is therefore zero, and the total output at terminal 34 is zero.

The circumstance of a lagging input signal is shown in FIG. 9 wherein the logical adding of waveforms (a) and (b) in AND circuit 32 results in spaced pulse (c). In gate circuit 30, the reference signal delayed by 90° and the output of AND circuit 32 gate the input signal at 0° to spaced pulses shown at waveform (g). The spaced pulses of waveform (c) coincide with the negative portions of the reference signal advanced by 90° so that gate 31 is not rendered conductive and no output appears at waveform (h). Summing circuit 33 therefore provides an output which is the spaced pulses of waveform (g) at terminal 34.

As previously described, summing circuit 33 can take the form of any conventional algebraic summing device such as that shown in FIG. 5, or it can be replaced by a logical device such as that shown in FIG. 2.

Figure 4:
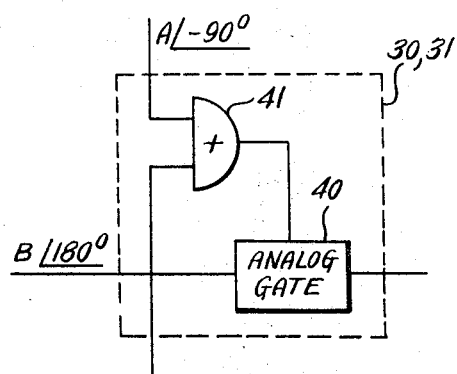
FIG. 4 is a schematic diagram of a gate circuit usable in the apparatus of FIG. 3.

The two-control input circuits 30 and 31 can take any form which satisfies the previously described operational requirements. One such form is shown in FIG. 4, in which gate circuits 30 or 31 are seen to include a conventional analog gating device 40 and an AND circuit 41. The output of AND circuit 41 is connected to the control input terminal of gate circuit 40, the two input terminals of AND circuit 41 being the two control input terminals for the gate. The switchable input of the analog gate 40 is the switchable input of gate circuits 30, 31. As will be recognized, unless both input terminals of AND circuit 41 are provided with the appropriate signal, no control signal is provided to the control terminal of gate 40 and the switchable path remains nonconductive. With the two signals provided, the gate is rendered conductive and the signal applied at the input to the conductive path appears at its output.

It was previously mentioned that the analog gate can be viewed as a conventional electromagnetic relay having a switchable set of contacts. It will also be recognized that other devices of a solid state or magnetic nature can be used, such as field effect transistors or saturable cores.

While certain advantageous embodiments have been chosen to illustrate the invention, it will be understood by those skilled in the art that various changes and modifications can be made therein without departing from the scope of the invention as defined in the appended claims.

What is claimed is:

1. Apparatus for producing a phase error signal the amplitude of which is representative of the angular phase separation between an input signal and a zero reference, the apparatus comprising the combination of means for providing three reference signals each of which is separated from each other and from the zero reference by an integral multiple of 90°; first gate circuit means having three input terminals and an output terminal for providing a signal at said output terminal only when signals of a preselected polarity are provided at all of said input terminals; second gate circuit means having three input terminals and an output terminal for providing a signal at said output terminal only when signals of a preselected polarity are provided at all of said input terminal; first AND circuit means for accepting the input signal and a first one of said reference signals and for providing the logical sum of said signals at an output terminal; circuit means for providing the output of said AND circuit means to one input terminal of each of said first and second gate circuit means; circuit means for connecting the input signal and a second one ofsaid reference signals to the other two input terminals of said first gate circuit means; circuit means for connecting the third one of said reference signals to a second one of said input terminals of said second gate circuit means; circuit means for inverting and connecting said input signal to the third one of said input terminals of said second gate circuit means; and summing circuit means for algebraically adding the outputs of said first and second gate circuit means to produce a phase error signal.

2. Apparatus according to claim 1 wherein said first and second gate circuit means each comprises an analog gate circuit having two input terminals; and a second AND gate having two input terminals and an output terminal, said output terminal of said AND circuit being connected to one input terminal of said analog gate circuit, said second AND circuit input terminals being connected to the reference signal and the output of said first and AND circuit means.

3. A method of determining the phase relationship between an input signal and a phase-zero reference signal comprising the steps of logically adding the input signal and a signal inverted in phase from said reference to produce a gate signal; gating the input signal with both the gate signal and a first signal disposed at 90 electrical degrees from the reference; gating an inverted form of the input signal with both the gate signal and a second signal disposed 180 electrical degrees from the first signal; and algebraically adding the signals resulting from the gating steps to produced a phase error signal which has zero magnitude only if the input signal is in phase with the zero reference.

References Cited

UNITED STATES PATENTS

| | | | |
|---|---|---|---|
| 2,866,092 | 12/1958 | Raynsford | 328—134 |
| 3,107,306 | 10/1963 | Dobbie | 307—217 |
| 3,422,362 | 1/1969 | West | 328—134 |

DONALD D. FORRER, Primary Examiner

HAROLD A. DIXON, Assistant Examiner

U.S. Cl. X.R.

307—232